No. 889,799. PATENTED JUNE 2, 1908.
W. MIERSCH.
PROCESS FOR THE APPROXIMATE SEPARATION OF REACTION PRODUCTS RESULTING FROM THE SULFONATION OF AROMATIC BODIES.
SPECIMENS. APPLICATION FILED FEB. 9, 1907.
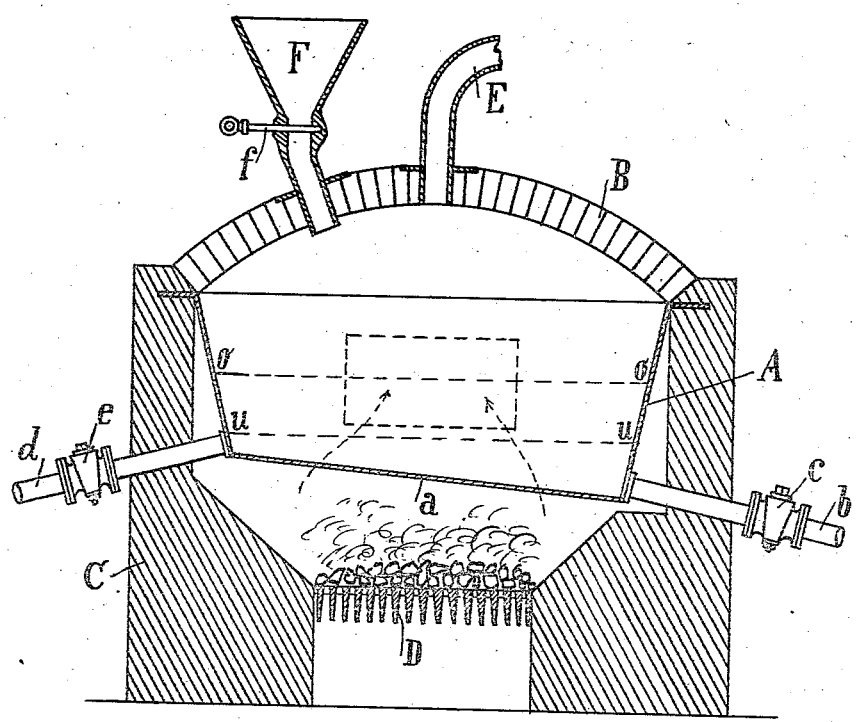

UNITED STATES PATENT OFFICE.

WALTHER MIERSCH, OF NIEDERSEDLITZ, NEAR DRESDEN, GERMANY.

PROCESS FOR THE APPROXIMATE SEPARATION OF REACTION PRODUCTS RESULTING FROM THE SULFONATION OF AROMATIC BODIES.

No. 889,799.  Specification of Letters Patent.  Patented June 2, 1908.

Application filed February 9, 1907. Serial No. 356,631. (Specimens.)

*To all whom it may concern:*

Be it known that I, WALTHER MIERSCH, a subject of the King of Saxony, and residing in Niedersedlitz, near Dresden, Saxony, Germany, have invented a new and useful Process for the Approximate Separation of the Reaction Products Resulting from the Sulfonation of Aromatic Bodies, of which the following is a specification.

It is well known, for the purpose of the further treatment of the reaction products of sulfonating mixtures, to treat them in aqueous solution with certain alkali-salts (more particularly common salt, Glauber salt, soda) generally in a cold state, but sometimes by heating the solution (boiling the solution with subsequent cooling). In addition to these sodium salts, other sodium or potassium salts are also suitable, such, for instance, as sodium sulfite, potassium sulfate, potassium sulfite, potassium carbonate, and chlorid of potassium. The inventor has discovered that if the reaction products of the sulfonating mixture be carefully heated with such an alkaline salt the gaseous mineral acid being allowed to escape, if desired, two distinctly separate layers will be finally formed, the upper one of which chiefly consists of organic substances, that is to say the sulfonate formed, together with residues of the sulfonating mixture that remain unchanged, and the bottom heavier layer almost entirely of bisulfate.

In carrying out the process with common salt, for example, the reaction products of the sulfonating mixture are first heated to about 40° C. and then the salt is added in small consecutive portions, or continuously, in such manner that there should be a continuous generation of gas, but no overboiling, the gas being allowed to escape if desired. The temperature is gradually increased as the salt introduced later on takes part in the reaction with greater difficulty. The heating is continued until the salt has all been introduced and practically used up by which time the temperature should be from 130° to 140° C. At this point the formation of two separate layers has commenced, and to complete the formation the temperature is increased, if necessary, to about 170°–180° C. The upper layer consists chiefly of organic substances, that is to say, of the sulfonate formed, together with residues of the mixture that remain unchanged, the bottom layer consisting almost entirely of bisulfate. This affords a new way of separating in a simple and rational manner the organic product (sulfonate and sulfonic acid) from the inorganic ingredients of the mixture, a bisulfate being obtained as a marketable product. The upper layer still contains, it is true, some inorganic substances, but, owing to their small proportion, it can be further treated in a very simple and convenient manner.

In the investigations which led to this invention, the starting point was not the usual reaction product of a sulfonating mixture more or less diluted with water; on the contrary the work of sulfonation was carried on without any addition of water, so that there could only be the question of working in a molten state, but not of working with an aqueous solution. As in that way it was possible to bring about the formation of layers without evaporating useless quantities of water, and as, moreover, the volume to be handled was considerably smaller, an addition of water in carrying out the process according to this invention must be avoided as much as possible. Generally speaking, the mixture in reaction contains sufficient water for carrying on the work with a satisfactory output of sulfonate of sodium. If, in the example given 12 kgs. of common salt are used for 58 kgs. of the reaction product of sulfonation, there is no necessity to add any water. Even if 14 kgs. of common salt are used, the object can be attained provided the work is carried on in a careful manner. In the latter case it is, however, advisable to add, as an additional precaution, a little water, namely, about 10% of the reaction mixture. An addition of water is therefore made in cases in which, for the purpose of increasing as far as possible, the output of sulfonate of sodium, it is desired to use as large a quantity of common salt as possible. This addition of water is effected beforehand. But even in such cases for economic reasons, the addition should not exceed the amount required for that purpose.

It is obvious that the process in question can be applied only to such sulfonic acids as are not decomposed at the temperatures and under the other conditions required for carrying out the process. Another requirement for the possibility of applying this process, is the presence of a sufficient excess of sulfuric acid in the sulfonating mixture which, however, exists in most cases.

In treating a reaction product containing benzol-mono-sulfonic acid, an "artificial" addition of sulfuric acid need not be made, as the product in itself contains sufficient sulfuric acid for bringing about the reactions desired. There may, however, be cases in which the process in question is not applicable (although the sulfonic acids in question are otherwise quite suitable for the purpose) only because the reaction mixture does not contain sufficient sulfuric acid required by the reactions intended in which cases therefore it would be necessary to use artificial addition of sulfuric acid.

A reaction product as shown in the following table has been successfully treated:

| | Benzol. | $H_2SO_4$. | $C_6H_5SO_3H$. | $H_2O$ and traces of foreign substances. | Together. |
|---|---|---|---|---|---|
| 1. Reaction product with 100% sulfuric acid produced | 2.00 | 32.99 | 56.60 | 8.41 | 100.0 |

As an example, a method of carrying out the process with a mixture containing benzene-mono-sulfonic acid by the addition of common salt may be described—58 kgs. of the last mentioned mixture with about 10% of free water are gradually mixed with about 12 kgs. of common salt and carefully heated. Gaseous hydrochloric acid will then escape. At 130–140° C., sometimes (for reasons which cannot be easily explained) only at a slightly higher temperature, the above mentioned formation of layers takes place. The development of hydrochloric acid is then nearly completed, and the layers can be sharply separated with very little trouble. The upper layer contains, in addition to free benzene-sulfonic acid and a little free sulfuric acid, completed sulfonate of sodium, the bottom layer consists only of a marketable bisulfate of sodium, approximately of 90–95% of pure bisulfate. It should be remarked that it is not here a question of the mere settling of the bisulfate separated in a solid state. In that case it would be impossible to talk of two layers. If it were so, in view of the temperature employed there would be a single liquid with a solid settlement or precipitate at the bottom. The bottom (or bisulfate) layer appears, however, as a fairly clear layer which, when hot, is liquid and which solidifies only on cooling, and the upper (sulfonic) layer is dark when hot, and when cold solidifies. After cooling, the bisulfate layer is non-transparent, of a white to dirty-white color, brilliant, and of course crystalline structure, while the fine crystalline sulfonic layer is lighter in weight and darker.

The separation of the two layers can be effected in the liquid state, for instance, by separately discharging and collecting them, by arranging in a vessel with a conical bottom two superposed cocks in the well known manner, and allowing first the bisulfate layer to escape through the bottom one, and then the sulfonic layer through the upper one, as soon as dark liquid appears when the upper cock is opened. It is also possible to separate the two cakes in solid state by forcing them apart.

The process could be carried out in a rational manner in an apparatus shown in the accompanying drawing in which A is the boiler with arched cover B which is built into a suitable furnace C with combustion chamber D. The bottom a of the boiler is inclined towards one side. At the lowest point of the bottom is arranged the outlet b with a cock c, and at the highest point of the bottom the outlet d with a cock e. After the treatment of a charge, the line o o may indicate the level of the upper layer, and the line u u the level of the bottom layer. Then, by opening the cock c, the bottom layer is drawn off. As soon as, on opening the cock e, nothing of the bottom layer is seen, the cock c is closed, and the upper layer discharged through the cock e. In this way, the chief quantities of the two layers can be neatly separated. The mass from the contact zone between the two layers remains then as a residue in the boiler A and is added to the new charge.

From an opening in the cover b of the boiler, starts a pipe E which either conveys the gaseous mineral acid (if it is not to be recovered) into a chimney, or, if it is desired to obtain the acid as a by-product, more particularly hydrochloric acid, into a condenser not shown in the drawing. The funnel F with a valve can be used for introducing the salt.

What I claim as my invention and desire to secure by Letters Patent is:—

1. The herein described process for obtaining a mixture containing aromatic sulfonic acids and their salts of alkali metals which consists in mixing the reaction product of sulfonation with an alkali salt of a mineral acid and cautiously heating the mixture until it separates into two layers containing respectively the bisulfate of the alkali and the sulfo-compounds.

2. The herein described process for obtaining a mixture containing aromatic sulfonic acids and their salts of alkali metals which consists in mixing an undiluted reaction product of sulfonation with an alkali salt of a mineral acid and cautiously heating the mixture until it separates into two layers containing respectively the bisulfate of the alkali and the sulfo-compounds.

3. The herein described process for obtaining a mixture containing aromatic sulfonic acids and their salts of alkali metals which consists in mixing a reaction product of sulfonation with an alkali salt suitable for fixing the acids formed, and cautiously heating the mixture until it separates into two layers containing respectively the bisulfate of the alkali and the sulfo-compounds.

4. The herein described process for obtaining a mixture containing aromatic sulfonic acids and their salts of alkali metals from the reaction products of sulfonation containing sulfuric acid, which consists in mixing with the said products a salt of an alkali which will fix the acids produced and cautiously heating the mixture until it separates into two layers containing respectively the bisulfate of the alkali and the sulfo-compounds.

In testimony whereof I have signed my name to this specification in the presence of two subscribing witnesses.

WALTHER MIERSCH.

Witnesses:
   PAUL LIENEMANN,
   RICHARD IFFERTE.